United States Patent
Teague et al.

(10) Patent No.: US 8,477,710 B2
(45) Date of Patent: Jul. 2, 2013

(54) METHOD OF PROVIDING A GAP INDICATION DURING A STICKY ASSIGNMENT

(75) Inventors: Edward Harrison Teague, San Diego, CA (US); Aamod Khandekar, San Diego, CA (US); Dhananjay Ashok Gore, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 915 days.

(21) Appl. No.: 11/022,144

(22) Filed: Dec. 22, 2004

(65) Prior Publication Data

US 2006/0034173 A1 Feb. 16, 2006

Related U.S. Application Data

(60) Provisional application No. 60/590,112, filed on Jul. 21, 2004.

(51) Int. Cl.
*H04W 4/00* (2009.01)

(52) U.S. Cl.
USPC ........... 370/330; 370/318; 370/235; 455/512; 455/450; 455/451

(58) Field of Classification Search
USPC .............. 370/338, 389, 392, 395.1, 235, 330, 370/331, 318, 335, 342, 441; 455/512, 450, 455/451
See application file for complete search history.

(56) References Cited

U.S. PATENT DOCUMENTS

| | | | |
|---|---|---|---|
| 4,574,374 A | | 3/1986 | Scordo |
| 5,299,199 A | * | 3/1994 | Wilson et al. ................. 370/347 |
| 5,615,213 A | * | 3/1997 | Griefer ......................... 370/412 |
| 5,625,877 A | | 4/1997 | Dunn et al. |
| 5,768,531 A | | 6/1998 | Lin |
| 5,983,099 A | * | 11/1999 | Yao et al. .................... 455/426.1 |
| 6,650,629 B1 | * | 11/2003 | Takahashi et al. ............ 370/335 |
| 6,928,062 B2 | | 8/2005 | Krishnan et al. |
| 7,042,857 B2 | | 5/2006 | Krishnan et al. |
| 7,177,297 B2 | | 2/2007 | Agrawal et al. |
| 7,180,879 B2 | | 2/2007 | Sinnarajah et al. |

(Continued)

FOREIGN PATENT DOCUMENTS

| | | |
|---|---|---|
| CL | 029792000 | 10/2001 |
| CL | 034692000 | 11/2001 |

(Continued)

OTHER PUBLICATIONS

International Search Report—PCT/US2005/025168, International Search Authority—European Patent Office—Nov. 24, 2005.

(Continued)

*Primary Examiner* — Dady Chery
(74) *Attorney, Agent, or Firm* — Nerrie M. Zohn

(57) ABSTRACT

A method and apparatus are provided to manage the assignment transmission resource of forward and reserve link that is assigned to transmitting entity for a period of time. An indication of a gap is provided whenever the transmitting entity is not transmitting actual data packets (e.g. whole or part of intended data or content), yet the transmitting entity is to maintain the assignment of the allocated resource. For example, an erasure signature packet comprising a first data pattern is transmitted on the assigned resource when there is no actual data to transmit on the assigned resource.

47 Claims, 5 Drawing Sheets

U.S. PATENT DOCUMENTS

| | | | |
|---|---|---|---|
| 7,181,666 | B2 | 2/2007 | Grob et al. |
| 7,197,692 | B2 | 3/2007 | Sutivong et al. |
| 7,218,633 | B2 * | 5/2007 | Donaghey .................... 370/389 |
| 7,221,680 | B2 | 5/2007 | Vijayan et al. |
| 7,395,309 | B1 | 7/2008 | Lewis et al. |
| 7,536,626 | B2 | 5/2009 | Sutivong et al. |
| 8,102,832 | B2 | 1/2012 | Agrawal et al. |
| 2001/0031634 | A1 | 10/2001 | Mizutani et al. |
| 2002/0004389 | A1 | 1/2002 | Yi et al. |
| 2002/0042827 | A1 | 4/2002 | Grobler et al. |
| 2002/0119773 | A1 | 8/2002 | Niemela |
| 2003/0033417 | A1 | 2/2003 | Zou et al. |
| 2003/0072267 | A1 | 4/2003 | Lohtia et al. |
| 2003/0076799 | A1 * | 4/2003 | Kwak et al. .................... 370/335 |
| 2003/0128676 | A1 | 7/2003 | Lee |
| 2003/0134655 | A1 | 7/2003 | Chen et al. |
| 2003/0174662 | A1 * | 9/2003 | Malkamaki .................... 370/310 |
| 2004/0033821 | A1 | 2/2004 | Slesak et al. |
| 2004/0042508 | A1 * | 3/2004 | Menzel ......................... 370/522 |
| 2004/0120253 | A1 | 6/2004 | Forssell et al. |
| 2004/0153565 | A1 | 8/2004 | Bloch et al. |
| 2005/0096061 | A1 | 5/2005 | Ji et al. |
| 2006/0018258 | A1 | 1/2006 | Teague et al. |
| 2006/0018393 | A1 | 1/2006 | Gore et al. |
| 2006/0019694 | A1 | 1/2006 | Sutivong et al. |
| 2006/0164993 | A1 | 7/2006 | Teague et al. |
| 2006/0279435 | A1 | 12/2006 | Krishnan et al. |
| 2007/0150799 | A1 | 6/2007 | Sutivong et al. |
| 2008/0214121 | A1 | 9/2008 | Sutivong et al. |
| 2009/0023466 | A1 | 1/2009 | Sutivong et al. |
| 2011/0282999 | A1 | 11/2011 | Teague et al. |
| 2011/0296279 | A1 | 12/2011 | Sutivong et al. |

FOREIGN PATENT DOCUMENTS

| | | |
|---|---|---|
| CL | 001802001 | 12/2001 |
| EP | 0903906 | 3/1999 |
| JP | 62226741 | 10/1987 |
| JP | 200210341 | 1/2002 |
| JP | 2004153623 | 5/2004 |
| WO | WO0103463 A1 | 1/2001 |
| WO | 02080464 | 10/2002 |
| WO | WO03105510 | 12/2003 |

OTHER PUBLICATIONS

Written Opinion—PCT/US2005/025168, International Search Authority—European Patent Office—Nov. 24, 2005.

International Preliminary Report on Patenability—PCT/US2005/025168, International Search Authority—The International Bureau of WIPO—Geneva, Switzerland—Jan. 23, 2007.

European Search Report—EP10176890, Search Authority—Munich Patent Office, Oct. 19, 2010.

Translation of Office Action in Japanese application 2010-248685 corresponding to U.S. Appl. No. 11/022,144, citing JP62226741, JP200210341 and JP2004153623 dated Jan. 25, 2011.

Translation of Office Action in Japanese application 2010-248686 corresponding to U.S. Appl. No. 11/022,144, citing JP62226741, JP200210341 and JP2004153623 dated Jan. 25, 2011.

* cited by examiner

METHOD OF PROVIDING A GAP INDICATION DURING A STICKY ASSIGNMENT

REFERENCE TO CO-PENDING APPLICATIONS FOR PATENT

The present application for patent claims a priority to Provisional Application No. 60/590,112 filed Jul. 21, 2004 assigned to the assignee hereof and expressly incorporated herein by reference. This application is related to the following U.S. patent applications: U.S. application Ser. No. 10/340,507, filed on Jan. 10, 2003, U.S. patent application Ser. No. 10/726,944, filed Dec. 3, 2003, U.S. application Ser. No. 10/426,546, filed on Apr. 29, 2003, U.S. patent application Ser. No. 10/858,870, filed Jun. 1, 2004, and U.S. patent application Ser. No. 10/890,717, filed Jul. 13, 2004, all of which are assigned to the assignee hereof, and expressly incorporated herein by reference.

FIELD OF INVENTION

The present invention relates generally to communication system and more specifically to techniques for a gap indication during a sticky assignment.

BACKGROUND

Wireless communication systems are widely deployed to provide various types of communication such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, and orthogonal frequency division multiple access (OFDMA) systems. Typically, a wireless communication system comprises several base stations, wherein each base station communicates with the mobile station using a forward link and each mobile station (or access terminal) communicates with base station using a reverse link.

In order to make the communication between base stations and terminals more efficient, a concept of sticky assignments is used. Sticky assignments are useful in a scheduled data transmission system in cases where many users are competing for limited assignment message resources. A sticky assignment is when a resource (e.g. a channel) that is assigned to a particular user continues to be available to that user after the standard unit of transmission (say "packet") is completed. Thus, a new assignment message is not necessary to enable that user to continue transmission.

Generally, when a transmitter of an access point or an access terminal completes transmitting a set of actual data and before transmitting another set of actual data packet, a break (also referred to as "a gap") in transmission occurs. The gap in data transmission refers to duration of time when no actual data is transmitted on the assigned resource (further discussed in FIG. 2). In a typical communication system, in the case of the access point transmitter, a possibility exists that the gap in transmission may be construed as, a loss of the assigned resource. In this case, the access terminal may request a assignment even though, the transmit resource is still allocated to the access terminal. In the case of the access point the gap may be interpreted as an indication that the access terminal no longer requires the assigned resource. In this case, the access point may assign the resource to another access terminal in the system. In both cases, it is inefficient and may lower the quality and reliability of the communication system.

Thus there is a need for a system and method to provide an indication of a gap in the transmission, so that the access point and access terminal do not interpret the gap in transmission as indication of not requiring the assigned resources or as an indication that the assigned resources were no longer available.

BRIEF SUMMARY

Accordingly, a method of managing an assignment of a resource assigned for transmitting data in communication system, the method transmitting a first data pattern on the assigned resource when there is no data to transmit on the assigned resource.

In another aspect, a method of managing an assignment of one or more resources assigned for data communication in communication system is provided, the method receiving one or more information bits on the assigned resource, and maintaining the assignment of said assigned resource, if determined that said one or more information bits represent an erasure signature packet.

A more complete appreciation of all the advantages and scope of the invention can be obtained from the accompanying drawings, the description and the appended claims.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs. The word "listening" is used herein to mean that a recipient device (access point or access terminal) is receiving and processing data received on a given channel.

Figure 1:
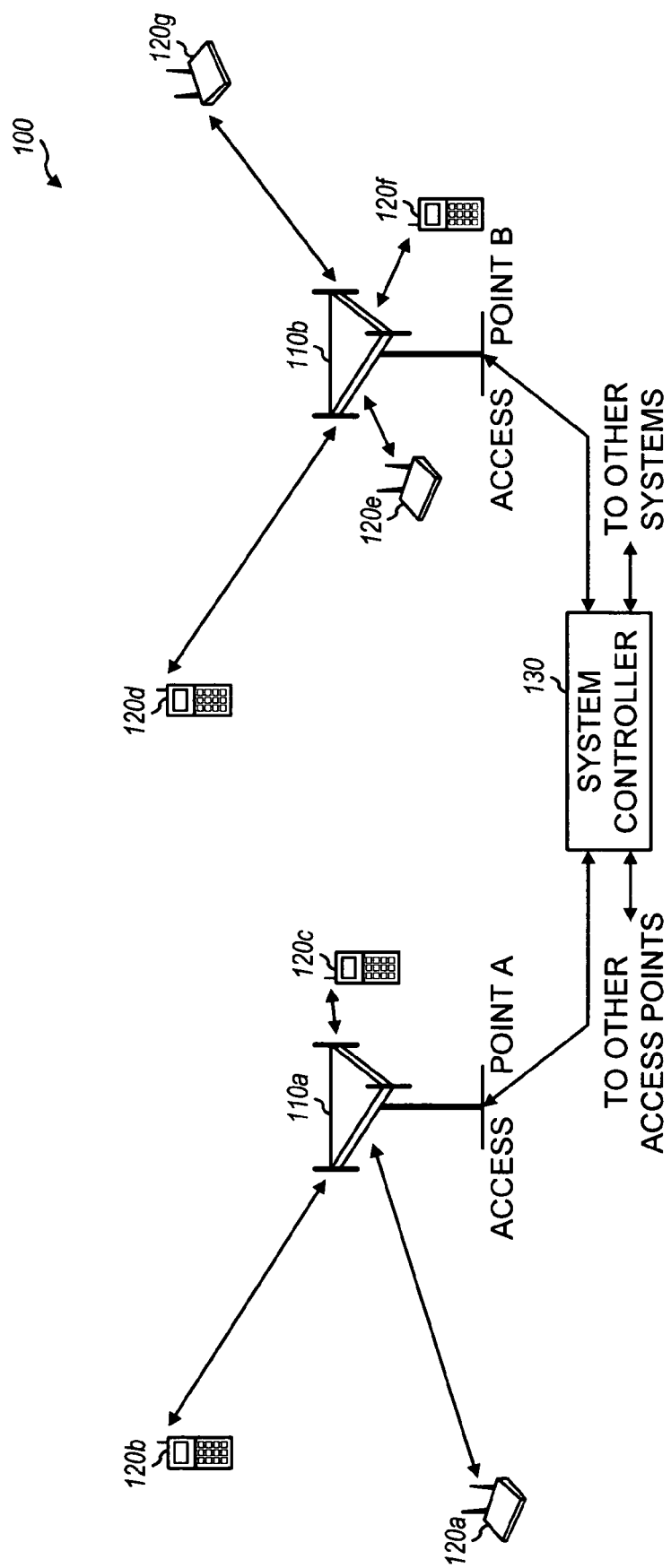
FIG. 1 shows a diagram of a wireless multiple-access communication system.

FIG. 1 shows a diagram of a wireless multiple-access communication system 100 that employs multi-carrier modulation. System 100 includes a number of access points (AP) 110 that communicate with one or more access terminal (AT) 120 (only two access points 110a and 110b are shown in FIG. 1 for simplicity). An AP 100x (110x is further discussed in FIG. 5, infra) is a fixed station that is used for communicating with the access terminals. An AP 110x may also be referred to as a base station or some other terminology.

Figure 5:
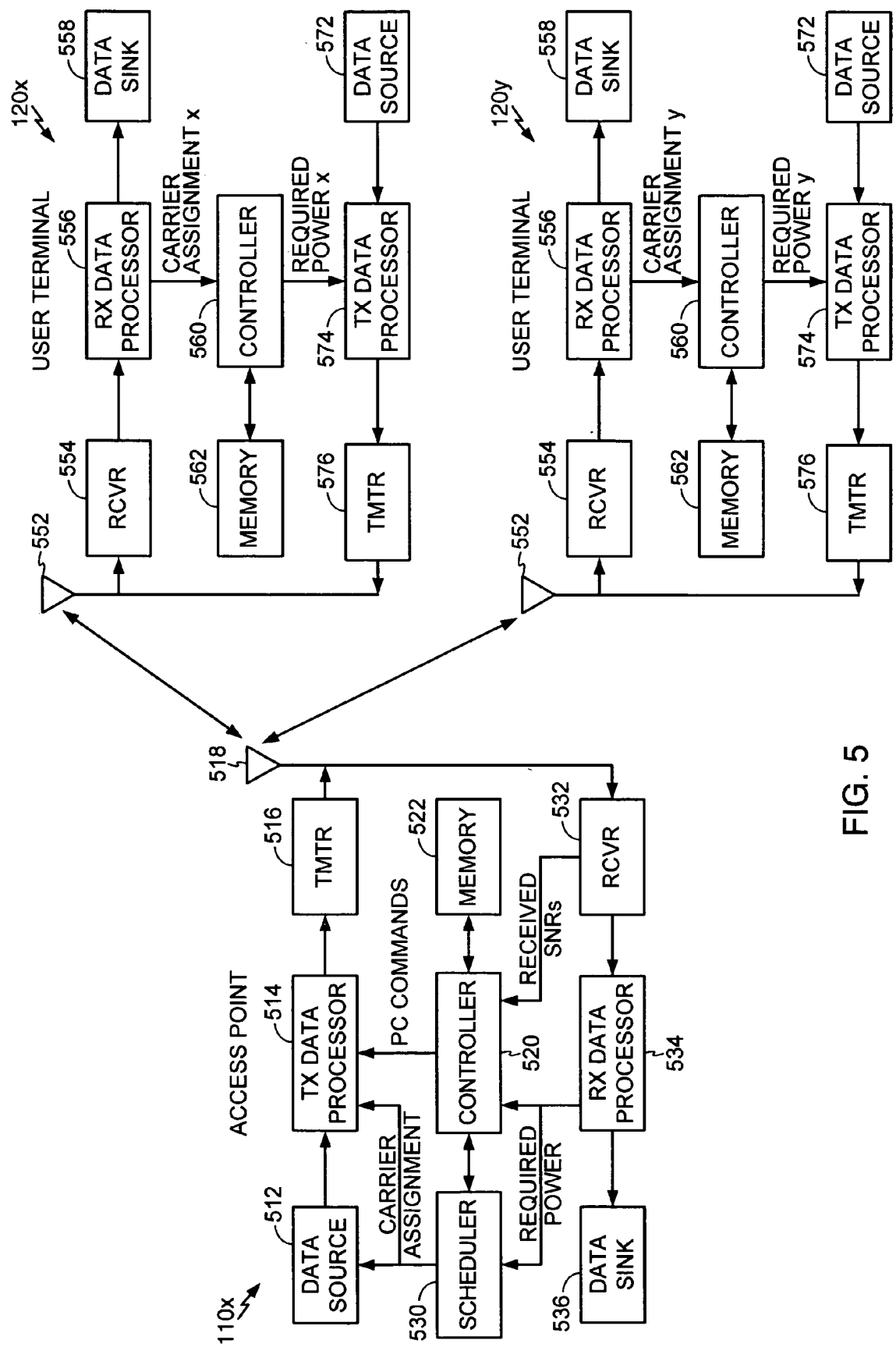
FIG. 5 shows a block diagram of an embodiment of an access point and two terminals.

An access point, for example AP 110x, is an electronic device configured to communicate with one or more access terminal, for example AT 120x (AT 120x is further discussed in FIG. 5, infra). The access point 110x may also be referred to as an access node, access network, a base station, base terminal, fixed terminal, a fixed station, base station controller, a controller, transmitter or some other terminology. The access point, base terminal, and base station are interchangeably used in the description below. The access point may be a general purpose computer, a standard laptop, a fixed terminal, an electronic device configured to transmit, receive and process data according to air interface methods defined by an OFDMA, CDMA, GSM, WCDMA, etc. system. The access point may be an electronic module comprising one or more computer chips controlled by a controller or a processor for transmitting, receiving and processing data according to air interface methods defined by an OFDMA, CDMA, GSM, WCDMA, etc.

An access terminal, for example AT 120x, is an electronic device configured to communicate with the AP 110x via a communication link. The AT 120x may also be referred to as an terminal, a user terminal, a remote station, a mobile station, a wireless communication device, recipient terminal, or some other terminology. The access terminal, mobile terminal, user terminal, terminal are interchangeably used in the description below. Each AT 120x may communicate with one or multiple access points on the downlink and/or uplink at any given moment. The downlink (i.e., forward link) refers to transmission from the AP 110x to the AT 120x, and the uplink (i.e., reverse link) refers to transmission from the AT 120x to the access point. The AT 120x may be any standard laptop, personal electronic organizer or assistant, a mobile phone, cellular phone, an electronic device configured to transmit, receive and process data according to air interface methods defined by an OFDMA, CDMA, GSM, WCDMA, etc. system. The AT 120x may be an electronic module comprising one or more computer chips controlled by a controller or a processor for transmitting, receiving and processing data according to air interface methods defined by an OFDMA, CDMA, GSM, WCDMA, etc. system.

A system controller 130 couples to the access points and may further couple to other systems/networks (e.g., a packet data network). System controller 130 provides coordination and control for the access points coupled to it. Via the access points, system controller 130 further controls the routing of data among the terminals, and between the terminals and other users coupled to the other systems/networks.

The techniques described herein for providing an indication of a gap in transmission may be implemented in various wireless multiple-access multi-carrier communication systems. For example, system 100 may be an OFDMA, CDMA, GSM, WCDMA, etc. system that utilizes data transmission.

In an embodiment, "sticky" assignments are used. Sticky assignments allow the system controller 130, to reduce assignment requests. Sticky assignments allow the recipient of a given resource to use the assigned resource to perform multiple communications (transmission or reception) without requesting a new assignment for each communication. For purpose of discussion, the AT 120x requests a reverse link transmit resource for transmitting data (actual data, content, etc.) to the AP 110x, that is servicing the AT 120x. Using an assignment message, the AP 110x provides the reverse link transmit resource assignment information, for example a channel identification, to the AT 120x that requested the assignment. Once, the assignment information is received, the AT 120x transmits actual data on the assigned reverse link channel (resource). In a sticky assignment, the assigned channel continues to be assigned to the AT 120x. Thus, at various times during the period that a channel is assigned, no actual data is transmitted or received by the AT 120x or the AP 110x. Therefore, a first data pattern, referred to as an erasure signature packet, is used to fill in the gaps in transmission. The length, the construction and the data rate of the erasure signature packet may vary based on available resources. Available resources may be determined by the system controller 130 or the AP that is in communication with requesting AT. For example, if the receiving entity has the resources to process erasure signature packets having more information bits (for example, 3 bits), the length of erasure signature packet is adjusted to provide more information bit. This may allow the receiving entity to easily determine that the packet received was an erasure signature packet. Also, the power level at which the erasure signature packets are transmitted may vary in order to transmit the erasure sequence at power lever low enough that transmission of the erasure sequence does not cause significant interference.

Figure 2:
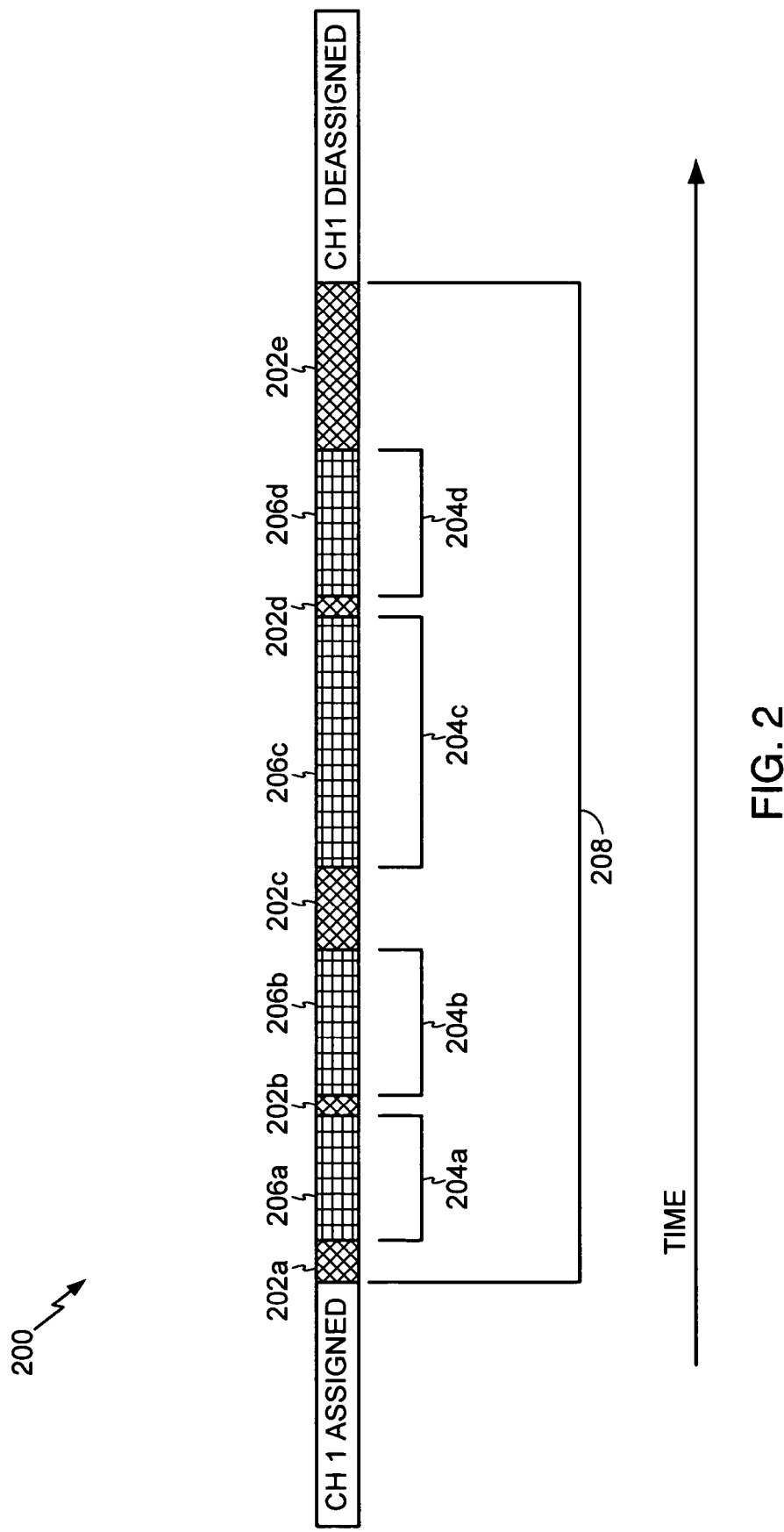
FIG. 2 shows an illustration of data traffic on an assigned channel during that uses a sticky assignment concept.

FIG. 2 shows an illustration 200 of data traffic on an assigned channel during using a sticky assignment concept. The sticky assignment duration 208 is generally between an assignment and a deassignment. During the sticky assignment duration 208, there may be several occurrence of transmission of data, for example 202*a*-202*d*, wherein transmit data packets are transmitted. Generally, data is not always transmitted continuously for the duration of sticky assignment 208, thus leaving gap portions, for example, 204*a*-204*d*. For purpose of discussion, whenever the TX data processor 574 of AT 120x, infra, is not sending data, the TX data processor 574 is configured to transmit an erasure signature packet, for example 206*a*-206*d*. The erasure signature packet may be one or more bits representing a unique pattern of data. In other words, the erasure signature packet fills the gap portions 204*a-d* with unique patterns and keeps the resources from getting terminated. The erasure signature packet may be a unique identifier that is known to both transmitter and the receiver prior to using the erasure signature packets. Also, in order to reduce interference, the erasure signature packet may be transmitted at low power and/or low data rate.

Figure 3:
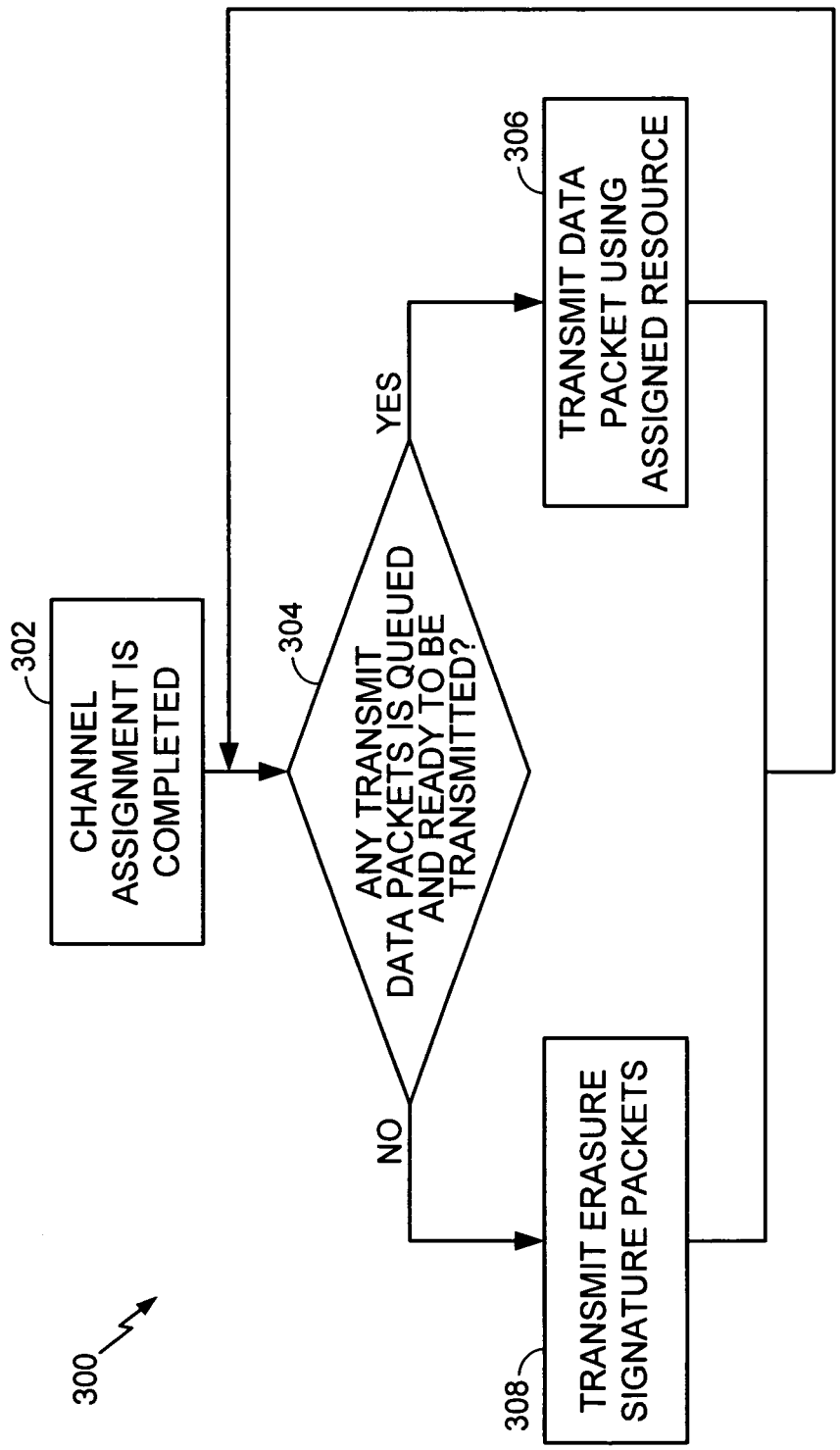
FIG. 3 shows process for data transmission by a access point during a sticky assignment of a resource on the forward link.

FIG. 3 shows a process 300 for data transmission by a processor (TX data processor 574 of AT or TX data processor 514 of AP) configured to transmit data during a sticky assignment of a transmit resource. For simplicity TX data processor 514 will be used to discuss the execution of the steps of process 300 for transmission of data on the forward link. The process 300 may also be implemented by the TX processor 574 for the transmission of data on the reverse link (e.g. transmitting data to AP). At step 302, the forward link data channel assignment is completed and the TX data processor 514 is ready to the send data, for example transmit data packet. At step 304, TX data processor 514 determines if any transmit data packets (for example, encoded data converted to data packets) are queued and ready to be transmitted. If determined that one or more data packets are ready to transmission, then at step 306, TX data processor 514 transmits the data packets using the assigned resource (ie, a forward link data channel for AP 110x and reverse link channel for terminal). Otherwise, at step 308, TX data processor 514 transmits a predetermined erasure signature packet using the assigned channel.

The erasure signature packet may be transmitted at a transmit power level that is lower than a predetermined threshold. The threshold may be predetermined and indicates a transmit power level such that transmitting above the threshold would cause interference. The erasure signature packets may also be transmitted at low data rate. Upon transmission of erasure packets or transmit data packets, the TX data processor 514 repeats the process and executes step 304 until the resources are deassigned or terminated.

Figure 4:
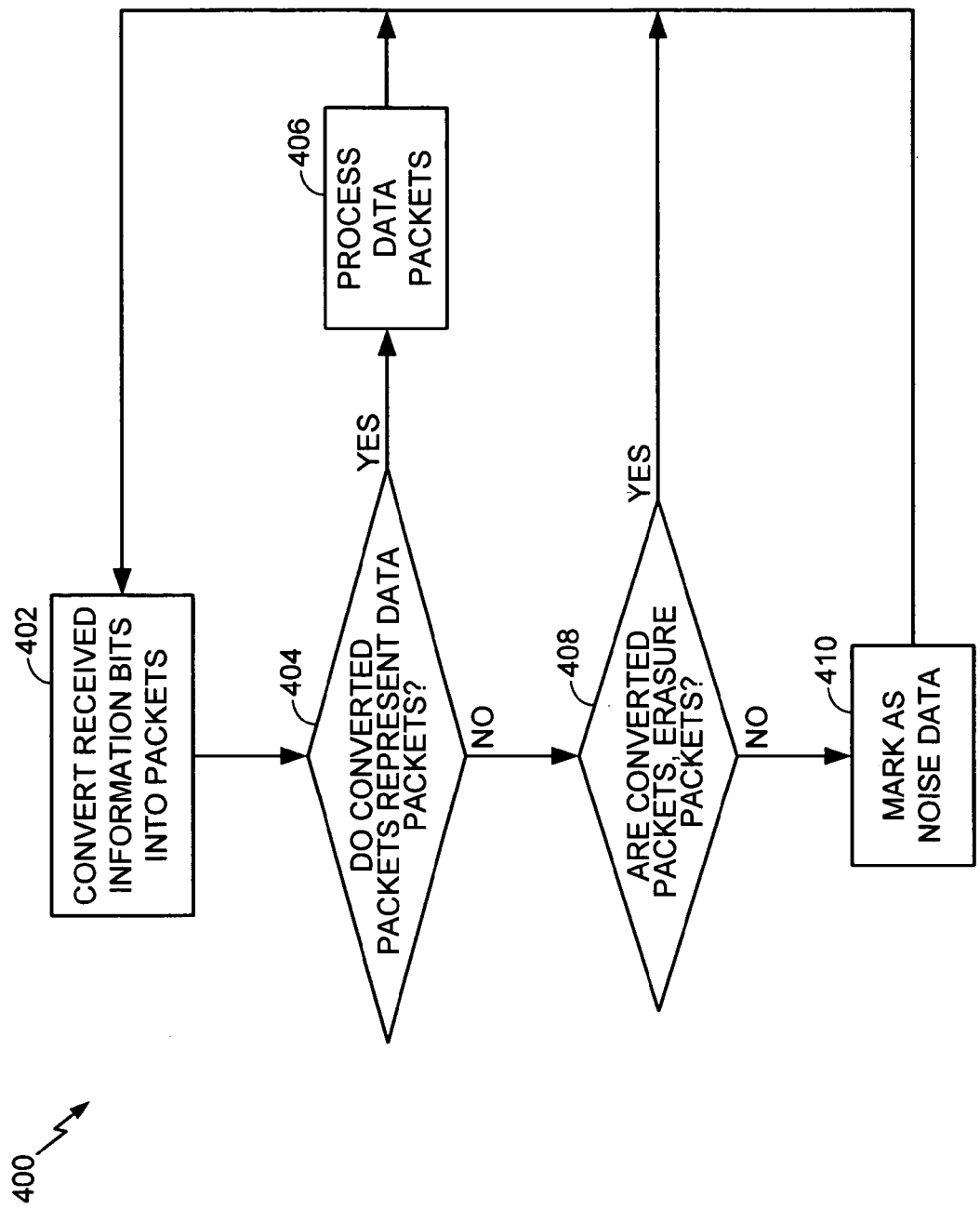
FIG. 4 shows process for data reception by a access point during a sticky assignment of a resource on the reverse link.

FIG. 4 shows a process 400 for processing data reception by a processor (RX data processor 556 of AT or RX data processor 534 of AP) configured to receive data during a sticky assignment of a resource. For simplicity RX data processor 534 will be used to discuss the execution of the steps of process 400 for reception of data on the reverse link. The process 400 may also be implemented by the RX processor 556 for the reception of data on the forward link (e.g. receiving data from AP). At step 402, one or more information bits are received over the assigned channel are evaluated as packets of data. At step 404, RX data processor 534 determines if the data packets represent actual data packets (encoded data transmitted by the transmitting entity). If so, then at step 406 RX data processor 534 process the data packets as normal. Otherwise, at step 408, RX data processor 534 determines if the data packets represent the erasure signature packets. If the data packets are erasure signature packets, then the packets are discarded and additional information bits are sampled at step 402. Otherwise, at step 410, RX data processor 534 flags the data packets as noise data and additional information bits are sampled at step 402. In an embodiment of AP 110x, the RX data processor 534 may continue to monitor the noise data and may determine that the resources are lost or may determine that the transmitting entity does not require the assigned resources after receiving noise data for a predetermine time.

FIG. 5 shows a block diagram of an embodiment of an AP 110x and two ATs 120x and 120y in multiple-access multi-carrier communication system 100. At AP 110x, a transmit (TX) data processor 514 receives traffic data (i.e., information bits) from a data source 512 and signaling and other information from a controller 520 and a scheduler 530. For example, controller 520 may provide power control (PC) commands that are used to adjust the transmit power of the active ATs, and scheduler 530 may provide assignments of carriers for the ATs. These various types of data may be sent on different transport channels. TX data processor 514 encodes and modulates the received data using multi-carrier modulation (e.g., OFDM) to provide modulated data (e.g., OFDM symbols). A transmitter unit (TMTR) 516 then processes the modulated data to generate a downlink modulated signal that is then transmitted from an antenna 518.

At each of ATs 120x and 120y, the transmitted and modulated signal is received by an antenna 552 and provided to a receiver unit (RCVR) 554. Receiver unit 554 processes and digitizes the received signal to provide samples. A received (RX) data processor 556 then demodulates and decodes the samples to provide decoded data, which may include recovered traffic data, messages, signaling, and so on. The traffic data may be provided to a data sink 558, and the carrier assignment and PC commands sent for the terminal are provided to a controller 560.

Controller 560 directs data transmission on the uplink using the specific carriers that have been assigned to the terminal and indicated in the received carrier assignment. Controller 560 further injects the erasure signature packets when the there is not actual data to transmit, yet desires to keep the assigned resources.

For each active terminal 120, a TX data processor 574 receives traffic data from a data source 572 and signaling and other information from controller 560. For example, controller 560 may provide information indicative of the required transmit power, the maximum transmit power, or the difference between the maximum and required transmit powers for the terminal. The various types of data are coded and modulated by TX data processor 574 using the assigned carriers and further processed by a transmitter unit 576 to generate an uplink modulated signal that is then transmitted from antenna 552.

At AP 110x, the transmitted and modulated signals from the ATs are received by antenna 518, processed by a receiver unit 532, and demodulated and decoded by an RX data processor 534. Receiver unit 532 may estimate the received signal quality (e.g., the received signal-to-noise ratio (SNR)) for each terminal and provide this information to controller 520. Controller 520 may then derive the PC commands for each terminal such that the received signal quality for the terminal is maintained within an acceptable range. RX data processor 534 provides the recovered feedback information (e.g., the required transmit power) for each terminal to controller 520 and scheduler 530.

Scheduler 530 may provide an indication to controller 520 to maintain the resources. This indication is provided if more data is scheduled to be transmitted. For the AT 120x, the controller 560 may determine if resources required to be maintained.

The techniques described herein may be implemented by various means. For example, these techniques may be implemented in hardware, software, or a combination thereof. For a hardware implementation, the processing units (e.g., controllers 520 and 570, TX and RX processors 514 and 534, and so on) for these techniques may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units (e.g., memory 522 in FIG. 5) and executed by processors (e.g., controllers 520). The memory unit may be implemented within the processor or external to the processor, in which case it can be communicatively coupled to the processor via various means as is known in the art.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method of managing resources for transmitting data in a communication system, comprising:
   receiving a sticky assignment of an assigned resource;
   transmitting a first data transmission on the assigned resource during the sticky assignment;
   transmitting a second data transmission on the assigned resource during the sticky assignment;

filling a gap between the first data transmission and the second data transmission by continuously transmitting one or more erasure signature packets on the assigned resource, whenever a data transmission is not being transmitted on the assigned resource during the sticky assignment; and wherein each of the one or more erasure signature packets comprises a pre-determined unique identifier, wherein the pre-determined unique identifier comprises one or more information bits that causes the sticky assignment to be maintained.

2. The method as claimed in claim 1, wherein said transmitting said one or more erasure signature packets comprises transmitting each said erasure signature packet at power level below a threshold.

3. The method as claimed in claim 1, wherein said transmitting said one or more erasure signature packets comprises transmitting each said erasure signature packet at power level that does not cause significant interference.

4. The method as claimed in claim 1, wherein said transmitting said one or more erasure signature packets comprises transmitting said one or more erasure signature packets at a low data rate.

5. The method as claimed in claim 1, wherein said transmitting said one or more erasure signature packets on said assigned resource comprises transmitting said one or more erasure signature packets using a forward link of the communication system.

6. The method as claimed in claim 1, wherein said transmitting said one or more erasure signature packets on said assigned resource comprises transmitting said one or more erasure signature packets using a reverse link of the communication system.

7. The method as claimed in claim 1, wherein said transmitting comprises transmitting in accordance with a Code Division Multiplex Access (CDMA) scheme.

8. The method as claimed in claim wherein. said transmitting comprises transmitting in accordance with an Orthogonal Frequency Division Multiplex (OFDM) scheme.

9. The method as claimed in claim 1, wherein said transmitting comprises transmitting in accordance with an Orthogonal Frequency Division. Multiple Access (OFDMA) scheme.

10. The method of claim 1, further comprising:
actively determining the presence of the gap between the first data transmission and the second data transmission.

11. The method of claim 1, further comprising:
transmitting the one or more erasure signature packets only during gaps between data transmissions on the assigned resource.

12. A method of managing resources in a communication system, comprising:
receiving one or more information bits on an assigned resource during a sticky assignment of the assigned resources;
evaluating the information bits as packets of data;
determining whether the packets of data represent data packets or erasure signature packets;
discarding the erasure signature packets and maintaining the sticky assignment of said assigned resources, when determined that said one or more information bits represent an erasure signature packet comprising a pre-determined unique identifier, the erasure signature packet filling a gap between data packets on said assigned resource, wherein the pre-determined. unique identifier comprises at least one information bit that causes assignment of the multiple resources to be maintained during the sticky assignment, wherein said erasure signature packet has a predetermined length selected based on available resources.

13. The method as claimed in claim 12, further comprising converting said one or more information bits into said data packets having the predetermined length.

14. The method as claimed in claim 12, wherein said receiving one or more information bits comprises receiving said information bits on a forward link of the communication system.

15. The method as claimed in claim 12, wherein said receiving one or more information bits comprises receiving said information bits on a reverse link of the communication system.

16. The method as claimed in claim 12, wherein said receiving comprises receiving in accordance with a Code Division Multiplex Access (CDMA) scheme.

17. The method as claimed in claim 12, wherein said receiving comprises receiving in accordance with an Orthogonal Frequency Division Multiplex (OFDM) scheme.

18. The method as claimed in claim 12, wherein said receiving comprises receiving in accordance with an Orthogonal Frequency Division Multiple Access (OFDMA) scheme.

19. An apparatus for managing resources assigned for transmitting data in a communication system, the apparatus comprising:
means for receiving a sticky assignment of an assigned resource;
means for transmitting a first data transmission on the assigned resource during the sticky assignment;
means for transmitting a second data transmission on the assigned resource during the sticky assignment; and
means for a filling a gap between the first transmission and the second data transmission by continuously transmitting one or more erasure signature packets on the assigned resource, whenever a data transmission is not being transmitted on the assigned resource during the first sticky assignment;
wherein each of the one or more erasure signature packets comprises a pre-determined unique identifier, wherein the pre-determined unique identifier comprises one or more information bits that causes the sticky assignment to be maintained.

20. The apparatus as claimed in claim 19, wherein said means for transmitting said one or more erasure signature packets comprises means for transmitting said each said erasure signature packet at power level below a threshold.

21. The apparatus as claimed in claim 19, wherein said means for transmitting said one or more erasure signature packets comprises means for transmitting said each said erasure signature packet at power level that does not cause significant interference.

22. The apparatus as claimed in claim 19, wherein said means for transmitting said one or more erasure signature packets comprises means for transmitting said one or more erasure signature packets at a low data rate.

23. An apparatus for managing resources assigned for data communication in a communication system, the apparatus comprising:
means for receiving one or more information bits on an assigned resource during a sticky assignment of the assigned resources;
means for evaluating the information bits as packets of data;
means for determining whether the packets of data represent data packets or erasure signature packets; and means for discarding the erasure signature packets and maintaining the sticky assignment of said assigned resources, when determined that said one or more information bits represent an erasure signature packet comprising a pre-determined unique identifier, the erasure signature packet filling a gap between data packets on said assigned resource, wherein the pre-determined unique identifier comprises at least one information bit that causes assignment of the multiple resources to be maintained during the sticky assignment, wherein said erasure signature packet has a predetermined length selected based on available resources.

24. The apparatus as claimed in claim 23, wherein said means for converting said one or more information bits comprises means for converting said information bits into said data packets having the predetermined length.

25. The apparatus as claimed in claim 23, wherein said means for receiving one or more information bits comprises means for receiving said information bits on a forward link of the communication system.

26. The apparatus as claimed in claim 25, wherein said means for receiving one or more information bits comprises means for receiving said information bits on a reverse link of the communication system.

27. In a wireless communication system, an apparatus comprising:
a processor that selects an erasure signature packet, wherein said selecting comprises selecting a length for said erasure signature packet based on available resources; and
a first electronic device that receives a sticky assignment of an assigned resource and continuously transmits one or more erasure signature packets on said assigned resource whenever there is no data to transmit on said assigned resource during the sticky assignment, the one or more erasure signature packets filling gaps between data on said assigned resource;
wherein the sticky assignment is scheduled to continue until a de-assignment of the assigned resource is received; and
wherein each of the one or more erasure signature packets comprise a pre-determined unique identifier, wherein the pre-determined unique identifier comprises one or more information bits that causes the sticky assignment to be maintained.

28. The apparatus as claimed in claim 27, wherein said first electronic device comprises a transmitter, said transmitter configured transmit said one or more erasure signature packets at power level below a threshold.

29. The apparatus as claimed in claim 27, wherein said first electronic device comprises a transmitter, said transmitter configured to transmit each said erasure signature packet at power level that does not cause significant interference.

30. The apparatus as claimed in claim 27, wherein said first electronic device comprises a transmitter configured to transmit said data pattern at a low data rate.

31. The apparatus as claimed in claim 27, wherein said first electronic device comprises a transmitter configured to transmit said data pattern using a forward link of the communication system.

32. The apparatus as claimed in claim 27, wherein said first electronic device comprises a transmitter configured to transmit said data pattern using a reverse link of the communication system.

33. The apparatus as claimed in claim 27, wherein said first electronic device is configured to transmit in accordance with a Code Division Multiplex Access (CDMA) scheme.

34. The apparatus as claimed in claim 27, wherein said first electronic device is configured to transmit in accordance with an Orthogonal Frequency Division Multiplex (OFDM) scheme.

35. The apparatus as claimed in claim 27, wherein said first electronic device is configured to transmit in accordance with an Orthogonal Frequency Division Multiple Access (OFDMA) scheme.

36. In a wireless communication system, an apparatus comprising:
a first electronic device that:
receives one or more information bits on an assigned resource during a sticky assignment of the assigned resources,
evaluates the information bits as packets of data,
determines whether the packets of data represent data packets or erasure signature packets, and
discards the erasure signature packets while maintaining the sticky assignment of said assigned resources when determined that said one or more information bits represent an erasure signature packet comprising a pre-determined unique identifier, the erasure signature packet filling a gap between data packets on said assigned resource,
wherein the pre-determined unique identifier comprises at least one information bit that causes assignment of the multiple resources to he maintained during the sticky assignment, and wherein said erasure signature packet has a predetermined length selected based on available resources.

37. The apparatus as claimed in claim 36, wherein said first electronic device comprises a processor configured to convert said information bits into data packets having the predetermined length.

38. The apparatus as claimed in claim 36, wherein said first electronic device comprises a processor configured to receive said information bits on a forward link of the communication system.

39. The apparatus as claimed in claim 36, wherein said first electronic device comprises a processor configured to receive said information bits on a reverse link of the communication system.

40. The apparatus as claimed in claim 36, wherein said first electronic device is configured to receive in accordance with a Code Division Multiplex Access (CDMA) scheme.

41. The apparatus as claimed in claim 36, wherein said first electronic device is configured to receive in accordance with an Orthogonal Frequency Division Multiplex (OFDM) scheme.

42. The apparatus as claimed in claim 36, wherein said first electronic device is configured to receive in accordance with an Orthogonal Frequency Division Multiple Access (OFDMA) scheme.

43. A non- transitory machine-readable medium comprising instructions which, when executed by a machine, cause the machine to perform operations including:
selecting an erasure signature packet, wherein said selecting comprises selecting a length for said erasure signature packet based on available resources;
receiving a sticky assignment of an assigned resource;
transmitting a first data transmission on the assigned resource during the sticky assignment;
transmitting a second data transmission on the assigned resource during the sticky assignment; and
filling a gap between the first data transmission and the second data transmission by continuously transmitting one or more erasure signature packets on the assigned resource, whenever a data transmission is not being transmitted on the assigned resource during the first sticky assignment;

wherein each of the one or more erasure signature packets comprises a pre-determined unique identifier, wherein the pre-determined unique identifier comprises one or more information bits that causes the sticky assignment to be maintained.

44. A non-transitory machine-readable medium comprising instructions which, when executed by a machine, cause the machine to perform operations including:

receiving one or more information bits on an assigned resource during a sticky assignment of the assigned resources, evaluating the information bits as packets of data, determining whether the packets of data represent data packets or erasure signature packets, and discarding the erasure signature packets and maintaining the sticky assignment of said assigned resources when determined that said one or more information bits represent an erasure signature packet comprising a pre-determined unique identifier, the erasure signature packet filling a gap between data packets on said assigned resource, wherein the pre-determined unique identifier comprises at least one information bit that causes assignment of the multiple resources to be maintained during the sticky assignment, and wherein said erasure signature packet has a predetermined length selected based on available resources.

45. An access terminal comprising:

a processor that selects an erasure signature packet, wherein said selecting comprises selecting a length for said erasure signature packet based on available resources; and a first electronic device that receives a sticky assignment of an assigned resource and continuously transmits one or more erasure signature packets on said assigned resource whenever there is no data to transmit on said assigned resource during the sticky assignment, the one or more erasure signature packets filling gaps between data on said assigned resource;

wherein the sticky assignment is scheduled to continue until a de-assignment of the assigned resource is received, and wherein each of the one or more erasure signature packets comprise a pre-determined unique identifier, wherein the pre-determined unique identifier comprises one or more information bits that causes the sticky assignment to be maintained.

46. An access point comprising:

a first electronic device configured to receive one or more information bits on an assigned resource during a sticky assignment of the assigned resource, and to discard said one or more information bits while maintaining the sticky assignment of said assigned resource when determined that said one or more information bits matches an erasure signature packet comprising a pre-determined unique identifier, the erasure signature packet filling a gap between data transmissions on said assigned resource, wherein the predetermined unique identifier comprises at least one information bit that causes the sticky assignment of the assigned resources to be maintained, wherein said erasure signature packet has a pre-determined length selected based on available resources, wherein the sticky assignment is scheduled to continue until a de-assignment of the assigned resource is received; and an antenna by which the one or more information bits are received.

47. A method of wireless communication, comprising:

receiving a sticky assignment of multiple communication resources, the sticky assignment being scheduled to continue until a de-assignment of the multiple communication resource is received;

transmitting data on an assigned resource of the multiple communication resources in response to receiving the stick assignment; and causing the assigned resource to be maintained during gaps in the data by continuously transmitting at least one erasure signature packet on the assigned resource whenever a data transmission is not being transmitted on the assigned resource during the sticky assignment, the at least one erasure signature packets filling the gaps;

the erasure signature packet(s) comprising a unique data pattern known to both the transmitter and receiver of the data as an indication that the multiple communication resource assignments should not be terminated.

* * * * *